(12) United States Patent  
Porter

(10) Patent No.: US 6,501,484 B1  
(45) Date of Patent: Dec. 31, 2002

(54) SYSTEM AND METHOD FOR HIGH DEFINITION VIDEO RESCALING

(75) Inventor: David Porter, Sacramento, CA (US)

(73) Assignee: Globalstreams, Inc., Emeryville, CA (US)

( * ) Notice: Subject to any disclaimer, the term of this patent is extended or adjusted under 35 U.S.C. 154(b) by 0 days.

(21) Appl. No.: 09/406,159

(22) Filed: Sep. 27, 1999

Related U.S. Application Data

(60) Provisional application No. 60/102,226, filed on Sep. 29, 1998.

(51) Int. Cl.[7] ............................. G06T 3/40; G09G 5/373
(52) U.S. Cl. ...................... 345/667; 348/581; 358/451; 358/528
(58) Field of Search ...................... 345/439, 127–131, 345/667–671; 382/298–301; 348/561, 562, 581, 582; 358/451, 528, 525

(56) References Cited

U.S. PATENT DOCUMENTS

| 4,703,349 | A |   | 10/1987 | Bernstein ................ 358/133 |
| 4,731,865 | A | * | 3/1988  | Sievenpiper |
| 5,018,090 | A |   | 5/1991  | Shiratsuchi .............. 364/723 |
| 5,301,266 | A | * | 4/1994  | Kimura |
| 5,309,484 | A |   | 5/1994  | McLane et al. ........... 375/106 |
| 5,572,608 | A | * | 11/1996 | Edgar |
| 5,729,357 | A | * | 3/1998  | Funada et al. |
| 5,748,866 | A | * | 5/1998  | Edgar |

OTHER PUBLICATIONS

Schumacher, Dale, "General Filtered Image Rescaling," *Image Processing*, Academic Press Inc., 1992, pp. 8–16.

* cited by examiner

*Primary Examiner*—Jeffery Brier  
(74) *Attorney, Agent, or Firm*—Thompson Coburn LLP

(57) ABSTRACT

A system and method for high definition video rescaling comprises receiving a source image including source pixels each having an associated amplitude, creating destination pixel locations for a rescaled image in accordance with a resealing factor, providing a normalized filter function, multiplying the normalized filter function with the amplitude of each source pixel to produce a filter function for each source pixel, and summing together the filter functions for the source pixels to generate a reconstructed function. The reconstructed function is sampled at the destination pixel locations to provide amplitudes for destination pixels. The amplitudes of the destination pixels are then incorporated into a rescaled image. The filter function is preferably a sinc product function. The sinc product function is a first sinc function having a first period multiplied by a second sinc function having a second period that is an odd integer multiple of the first period, so that the sinc product function has a smaller amplitude than a sinc function as the function converges to zero.

17 Claims, 12 Drawing Sheets

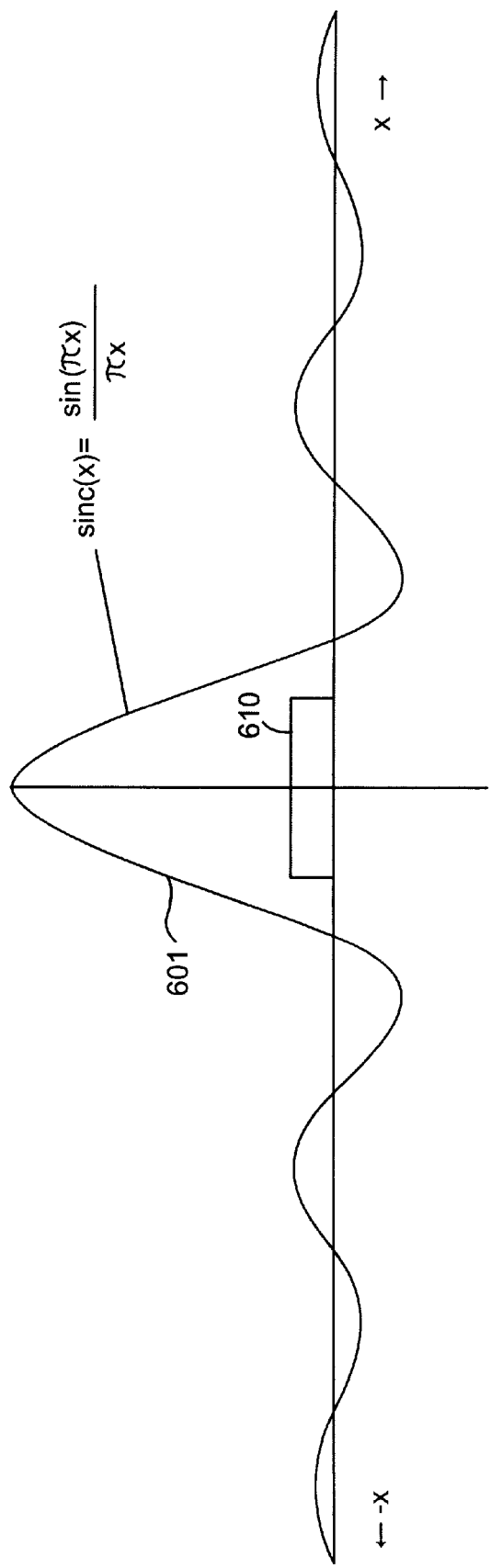

SYSTEM AND METHOD FOR HIGH DEFINITION VIDEO RESCALING

CROSS-REFERENCE TO RELATED APPLICATION

This application is related to, and claims the benefit of, U.S. Provisional Application No. 60/102,226, entitled "System And Method For High Definition Video Rescaling," filed on Sep. 29, 1998. The subject matter of the related application is hereby incorporated by reference. The related applications are commonly assigned.

BACKGROUND OF THE INVENTION

1. Field of the Invention

The present invention relates to image processing, and relates more particularly to high definition video image rescaling.

2. Description of the Background Art

Rescaling video images is an important aspect of many types of video and multimedia applications, and therefore efficient video resealing is a significant consideration of designers and manufacturers of image processing systems. A digital video image may be described as a grid of values that are samples of a continuous two-dimensional function. The value of each pixel of the video image represents the value of the continuous function at a point in the center of the pixel. A large video image typically includes a greater number of pixels, or samples, than a small video image. A large video image may. be reduced by decreasing the number of pixels, and a small video image may be magnified by increasing the number of pixels.

In video image resealing, a rescaled image typically includes destination pixels that are derived from source pixels of a source image. The contribution each source pixel makes to each destination pixel is determined by applying a filter function to each source pixel. Various types of filter functions may be used for video resealing. A filter function is typically centered on each source pixel and scaled to the value of the source pixel. The scaled filter functions are summed together to produce a reconstructed function for the source image. The reconstructed function is then sampled appropriately to produce the required number of destination pixels. A magnified image includes a greater number of pixels than the source image, and a reduced image includes a smaller number of pixels than the source image.

The operation of summing together the scaled filter functions may be computationally intense, requiring significant amounts of processing power and time. Some filter functions may produce high quality rescaled images, but have a very high cost in terms of system resources. Other filter functions may require fewer system resources, but produce lower quality rescaled images. Therefore, selecting an optimum filter function for efficient and effective video rescaling is a significant consideration of designers and manufacturers of image processing systems.

SUMMARY OF THE INVENTION

In accordance with the present invention, a system and method are disclosed for high definition video rescaling. In one embodiment, a set of source pixels is provided, each source pixel having an associated amplitude. A set of destination pixel locations is determined based on a resealing factor. A magnified image includes a greater number of pixels than the source image, and a reduced image includes a smaller number of pixels than the source image.

A normalized filter function is centered on each source pixel and scaled to the amplitude of the source pixel. The normalized filter function is the same for each source pixel. The filter functions for the source pixels are summed together to produce a reconstructed function. The reconstructed function is sampled at the destination pixel locations. The amplitude of the reconstructed function at the destination pixel locations is the amplitude of the destination pixel. The destination pixels are then incorporated into a rescaled image.

In the preferred embodiment of the present invention the filter function is a sinc product function. The sinc product function is a first sinc function having a first period multiplied by a second sinc function having a second period that is an odd integer multiple of the first period, so that the sinc product function has a smaller amplitude than a sinc function as the function converges to zero.

BRIEF DESCRIPTION OF THE DRAWINGS

FIG. 6 is an exemplary sinc function and associated pixel, according to the present invention;

DETAILED DESCRIPTION OF THE PREFERRED EMBODIMENT

The present invention relates to an improvement in image processing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes receiving a source image including source pixels each having an associated amplitude, creating destination pixel locations for a rescaled image in accordance with a rescaling factor, providing a normalized filter function, multiplying the normalized filter function with the amplitude of each source pixel to produce a filter function for each source pixel, and summing together the filter functions for the source pixels to generate a reconstructed function. The reconstructed function is sampled at the destination pixel locations to provide amplitudes for destination pixels. The amplitudes of the destination pixels are then incorporated into a rescaled image.

The filter function is preferably a sinc product function. The sinc product function is a first sinc function having a first period multiplied by a second sinc function having a second period that is an odd integer multiple of the first period, so that the sinc product function has a smaller amplitude than a sinc function as the function converges to zero.

Figure 1:
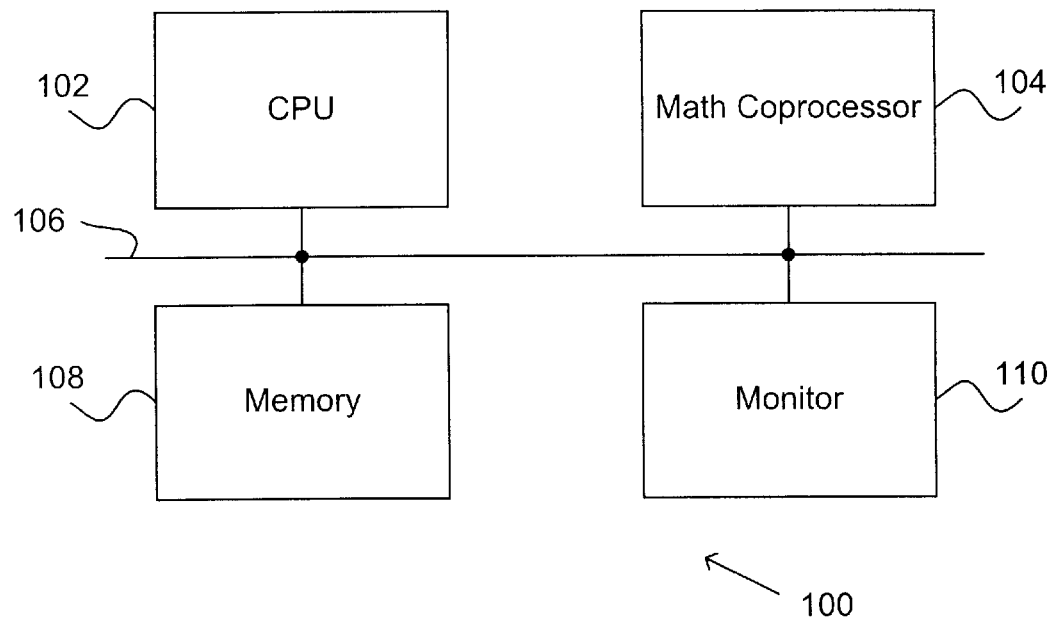
FIG. 1 is a block diagram for one embodiment of a computer system, according to the present invention.

Referring now to FIG. 1, a block diagram for one embodiment of a computer system 100 is shown, according to the present invention. Computer system 100 includes, but is not limited to, a Central Processing Unit (CPU) 102, a math coprocessor 104, a memory 108 and a monitor 110, all of which are connected by a system bus 106. Memory 108 may comprise a hard disk drive, random access memory (RAM) or any other appropriate memory configuration. Alternatively, computer system 100 may further comprise a keyboard and an input/output device (not shown).

Figure 2:
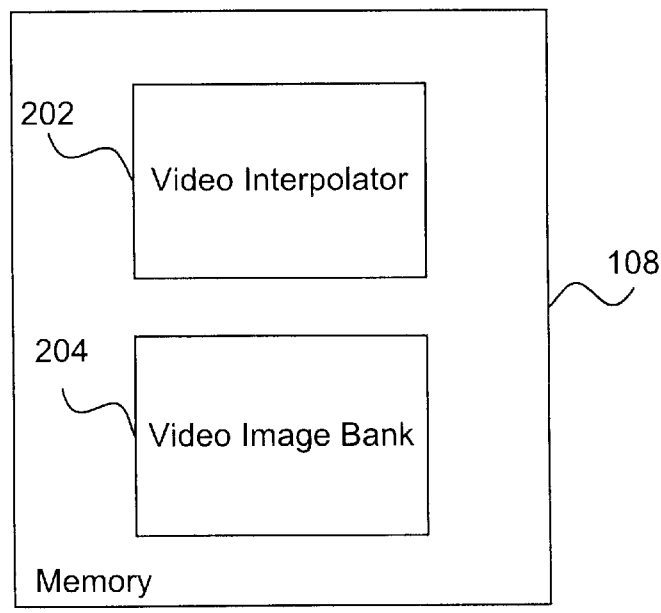
FIG. 2 is a block diagram for one embodiment of the memory of FIG. 1, according to the present invention.

Referring now to FIG. 2, a block diagram for one embodiment of memory 108 of FIG. 1 is shown, according to the present invention. Memory 108 includes, but is not limited to, a video interpolator 202 and a video image bank 204. Video image bank 204 contains both video input images and video output images. Video interpolator 202 processes the video input images to produce the video output images. The contents and functionality of video interpolator 202 are further discussed below.

Figure 3:
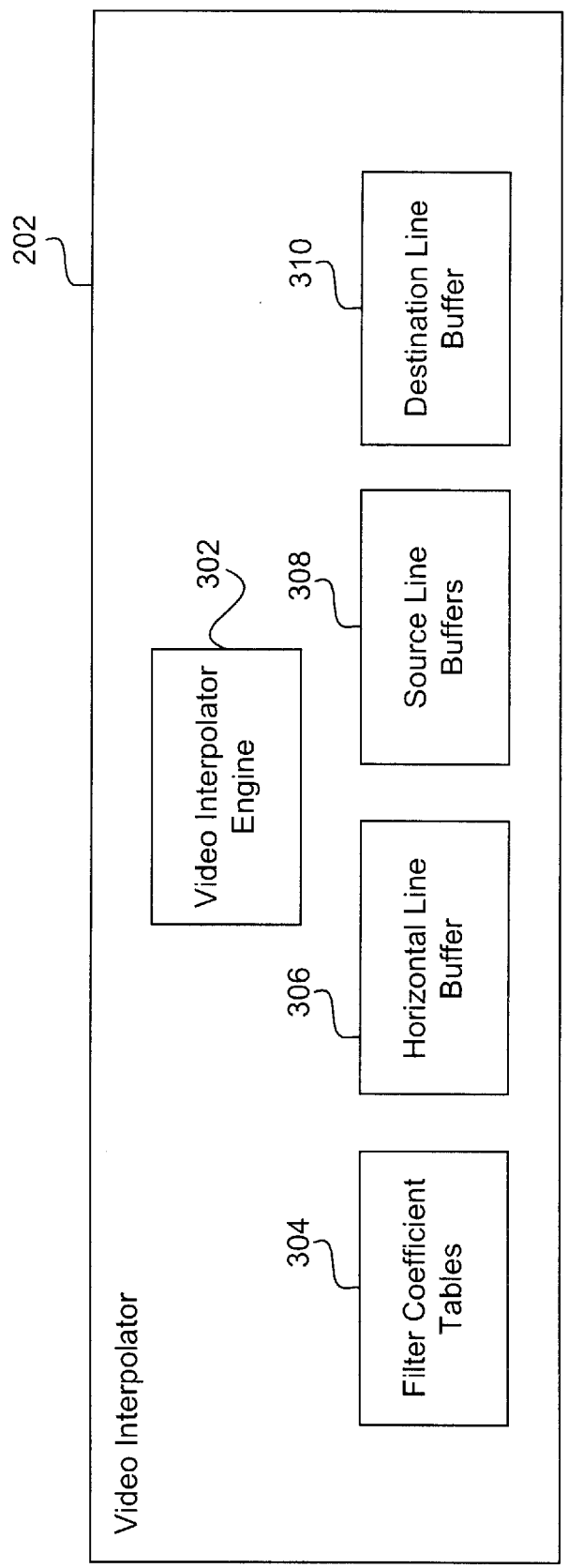
FIG. 3 is a block diagram for one embodiment of the video interpolator of FIG. 2, according to the present invention.

Referring now to FIG. 3, a block diagram for one embodiment of video interpolator 202 of FIG. 2 is shown, according to the present invention. Video interpolator 202 includes, but is not limited to, a video interpolator engine 302, filter coefficient tables 304, a horizontal line buffer 306, source line buffers 308, and a destination line buffer 310.

Video interpolator engine 302, in conjunction with math coprocessor 104 (FIG. 1), performs various numerical calculations to rescale the video input images contained in video image bank 204. Filter coefficient tables 304 include arrays of filter coefficients for each pixel displayed on monitor 110. The contents and functionality of filter coefficient tables 304, horizontal line buffer 306, source line buffers 308, and destination line buffer 310 are further discussed below in conjunction with FIGS. 4–9.

Figure 4:
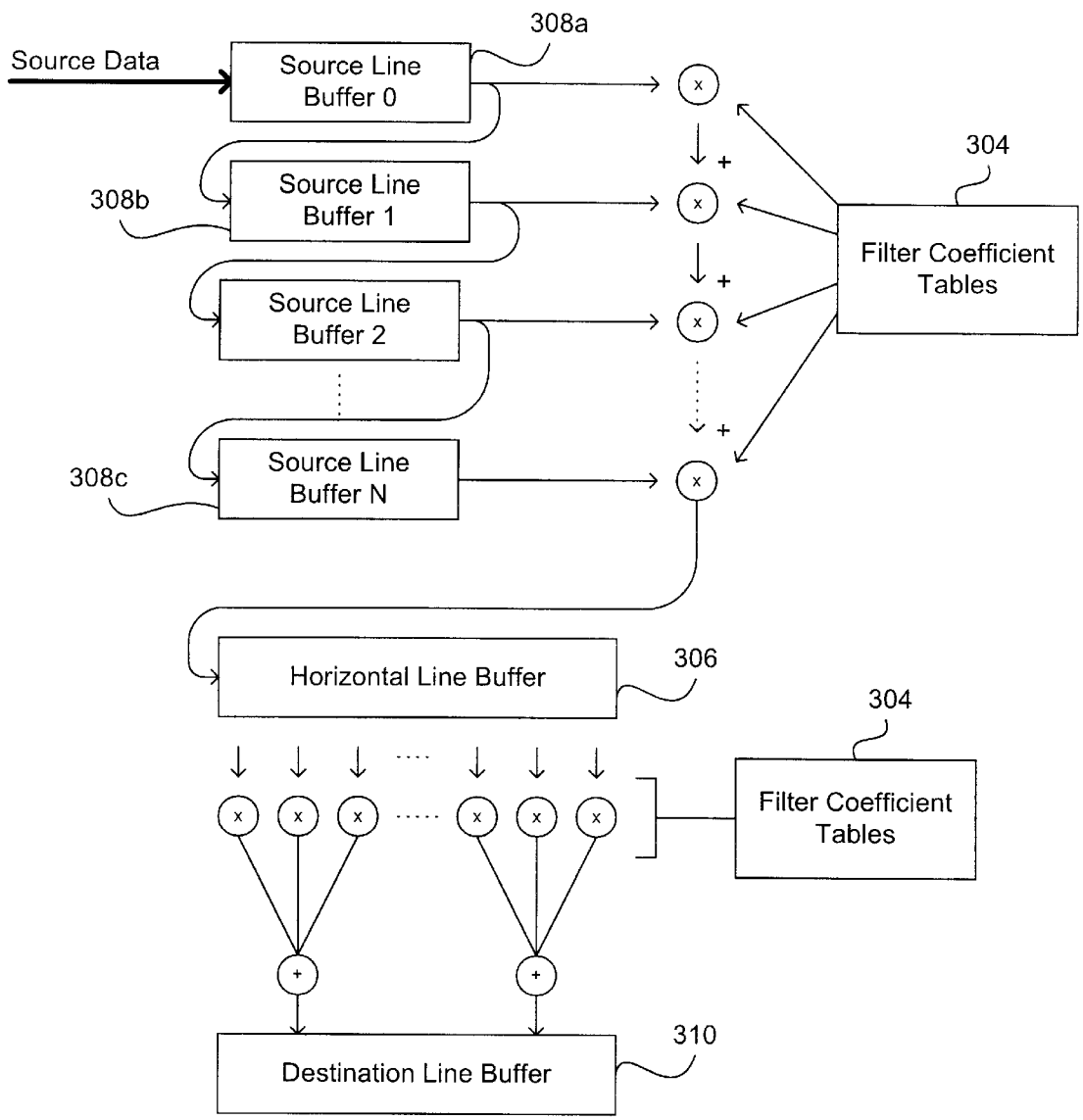
FIG. 4 is a block diagram for one embodiment of the operation of the video interpolator of FIG. 3, according to the present invention.

Referring now to FIG. 4, a block diagram for one embodiment of the operation of video interpolator 202 of FIG. 3 is shown, according to the present invention. Video interpolator engine 302 (FIG. 3) places source video data, which are vertical lines of a video input image from video image bank 204, into source line buffers 308a–308c. The number of source line buffers 308 may vary due to different requirements of various scaling operations. Indeed, video image expansion typically requires fewer buffers than compression.

Video interpolator engine 302 (FIG. 3) applies a normalized filter function to the source data in individual source line buffers 308a–308c. To increase efficiency of the resealing process, video interpolator engine 302 first normalizes the filter function for the first source line buffer 308a. Video interpolator engine 302 then advantageously stores the normalized filter coefficients of the filter function in filter coefficient tables 304. Video interpolator engine 302 utilizes the normalized filter coefficients for the remaining vertical lines of the video image data stored in source line buffers 308. The normalization process is further discussed below in conjunction with FIG. 5.

In addition, video interpolator engine 302 may use the normalized filter coefficients stored in filter coefficient tables 304 to resize subsequent video images 204 when the rescaling factor is the same. Storing and reusing the normalized filter coefficients significantly increases the efficiency of resealing multiple video images 204 by the same scaling factor. The normalized filter coefficients and filter coefficient tables 304 are further discussed below in conjunction with FIGS. 6–11.

After the video image data in source line buffers 308a–c have been multiplied by the normalized filter coefficients, video interpolator engine 302 sums the products to produce reconstructed image data for each pixel of the video input image. The reconstructed image data is stored in horizontal line buffer 306. Video interpolator engine 302 then applies a normalized filter function to the reconstructed image data to produce rescaled image data. Video interpolator engine 302 first determines the filter function to be applied to the first pixel of the reconstructed image data stored in horizontal line buffer 306. Video interpolator engine 302 then normalizes that function and uses the resulting normalized filter function for each remaining pixel in horizontal line buffer 306. The resulting data is then summed and stored in destination line buffer 310.

Video interpolator 202 processes video input data for each color component of the video image separately. For instance, if the video image is in RGB format, video interpolator engine 302 preferably processes the red component first, then the green component and finally the blue component of the video image.

Figure 5:
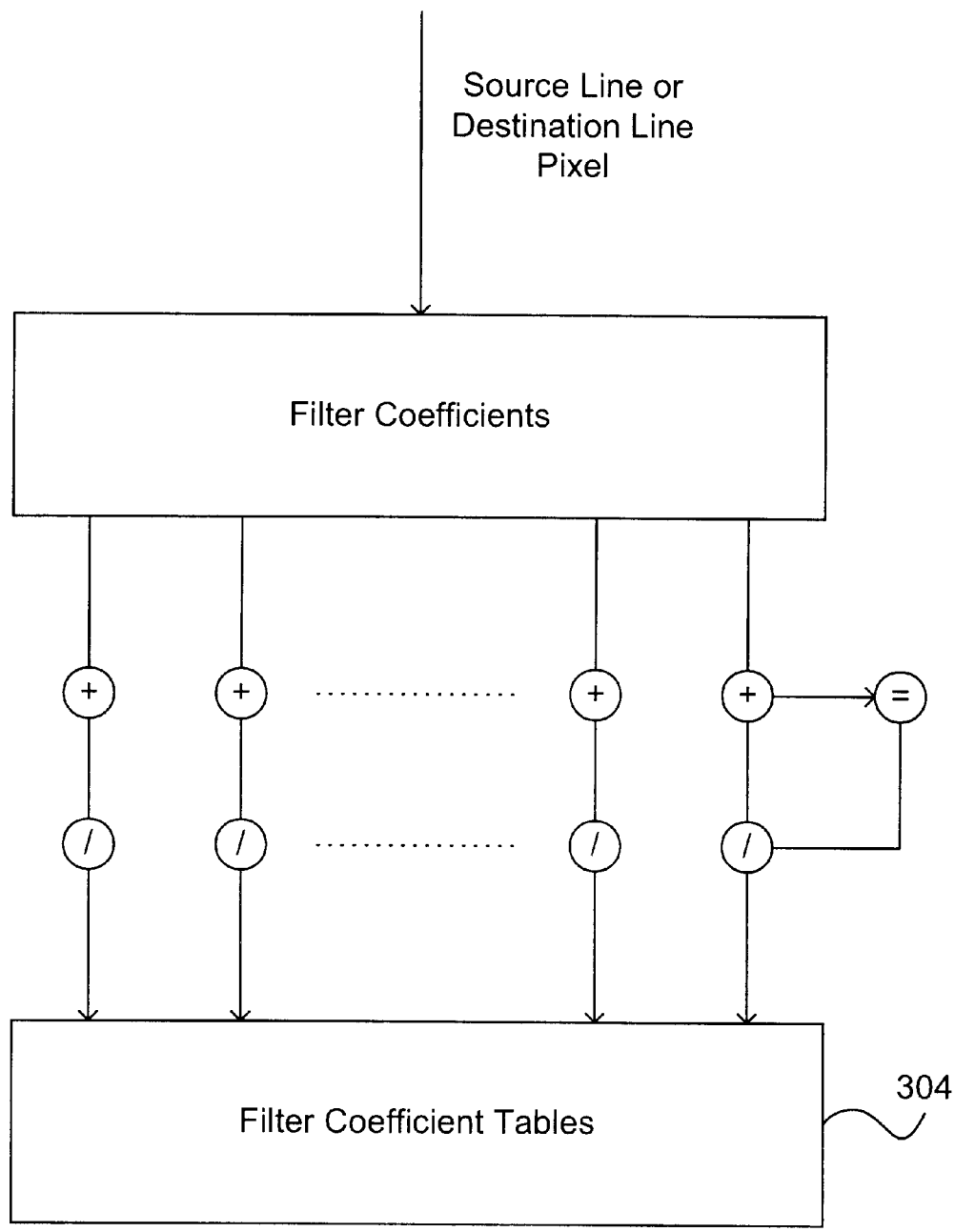
FIG. 5 is a block diagram for one embodiment of the normalization of filter coefficients by the video interpolator engine of FIG. 3, according to the present invention.

Referring now to FIG. 5, a block diagram for one embodiment of the normalization of filter coefficients by video interpolator engine 302 of FIG. 3 is shown, according to the present invention. Video interpolator engine 302 determines which filter coefficient table needs to be normalized based on the source line buffer being processed. Video interpolator engine 302 sums the coefficients in the appropriate filter coefficient table and then divides each coefficient by that sum to produce a normalized filter coefficient table, which is stored in filter coefficient tables 304.

Referring now to FIG. 6, an exemplary sinc function 601 and associated pixel 610 are shown, according to the present invention. A sinc function $f(x)$ 601 may be defined as:

$$f(x) \equiv \frac{\sin(\pi x)}{\pi x}.$$

Sinc function $f(x)$ 601 is a sine curve, $\sin(\pi x)$, that dampens from the origin by a factor $1/\pi x$. Sinc function $f(x)$ 601 may be used as a filter function, and conventional sampling theory states that sinc function 601 is an ideal filter function for reconstructing a magnified or reduced image. Sinc function 601 is centered on a pixel 610, and is scaled to the value of pixel 610. In other words, the maximum amplitude of sinc function 601 is equal to the value of pixel 610.

Figure 7A:
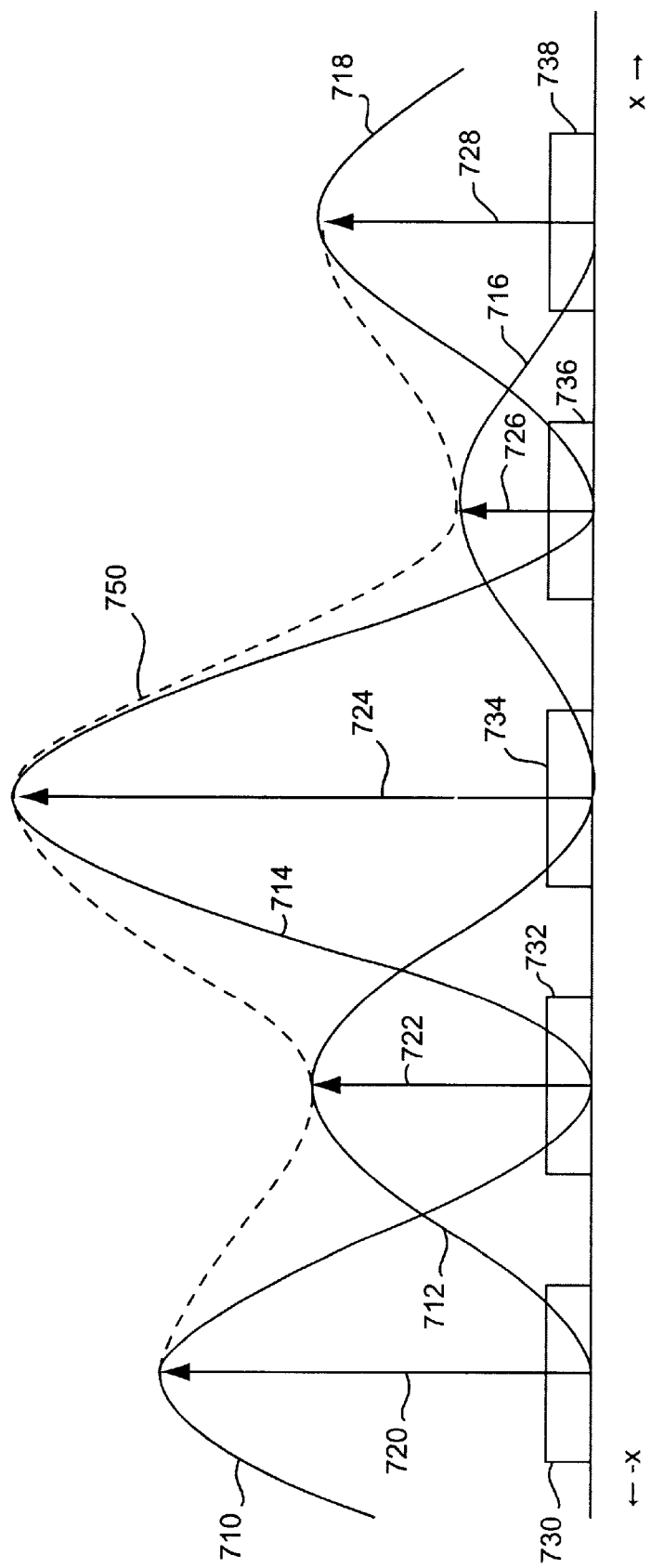
FIG. 7(a) is an exemplary waveform for a reconstructed image function, according to one embodiment of the present invention.

Referring now to FIG. 7(a), an exemplary waveform for a reconstructed image function 750 is shown, according to one embodiment of the present invention. Function 750 is reconstructed to magnify an image, and is the sum of five sinc functions, functions 710–718. Only the main lobe of each sinc function is shown for clarity and ease of discussion. Further, the resealing process is described in only one dimension since each dimension may be rescaled independently.

Function 710 represents the value of a source pixel 730 in a video input image, and has a maximum amplitude 720 centered at pixel 730. Function 712 represents the value of a source pixel 732, and has a maximum amplitude 722 centered at pixel 732. Functions 714–718 represent the values of source pixels 734–738 having maximum amplitudes 724–728, respectively. Thus functions 710–718 represent five adjacent pixels in the video input image.

The period of each function is chosen such that the initial zero crossing points of each function are centered at adjacent pixels. The period of each sinc function for pixels 730–738 is identical because the periodicity of the pixels along a given axis is assumed to be constant.

Reconstructed function 750 is the sum of the amplitudes of functions 710–718. Reconstructed function 750 thus represents continuous values for a one-dimensional segment of the video input image represented by pixels 730–738.

Figure 7B:
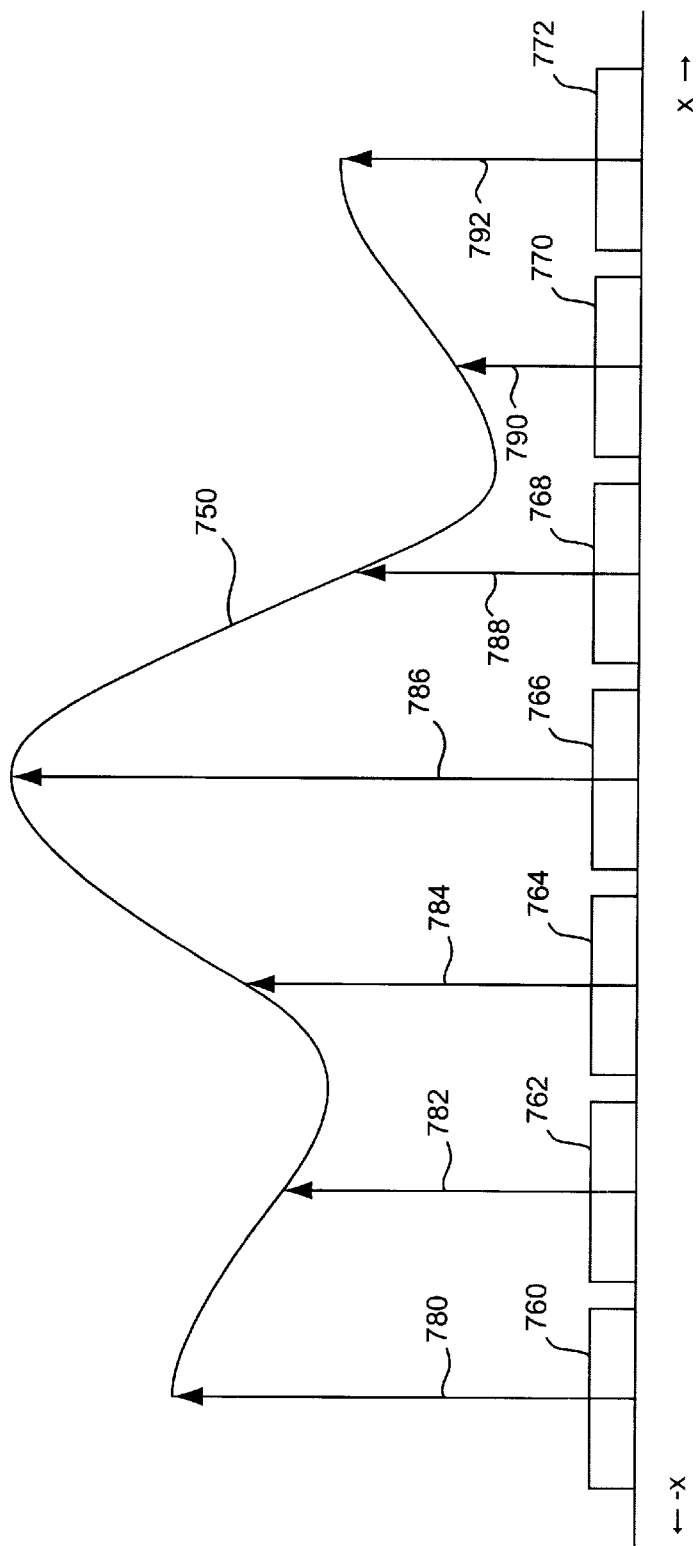
FIG. 7(b) is a set of rescaled pixels corresponding to the reconstructed image function of FIG. 7(a), according to one embodiment of the present invention.

Referring now to FIG. 7(b), a set of rescaled pixels corresponding to the reconstructed image function 750 of FIG. 7(a) is shown, according to one embodiment of the present invention. The FIG. 7(b) embodiment shows a magnification ratio of 7:5; seven destination pixels 760–772 replace the five source pixels 730–738 (FIG. 7(a)). Video interpolator 202 determines the values of destination pixels 760–772 by sampling amplitudes 780–792 of reconstructed function 750 at the locations of the seven destination pixels. Video interpolator 202 then sets the values of pixels 760–772 equal to these samples. Destination pixels 760–772 are then incorporated into a video output image that is stored in video image bank 204.

Figure 8A:
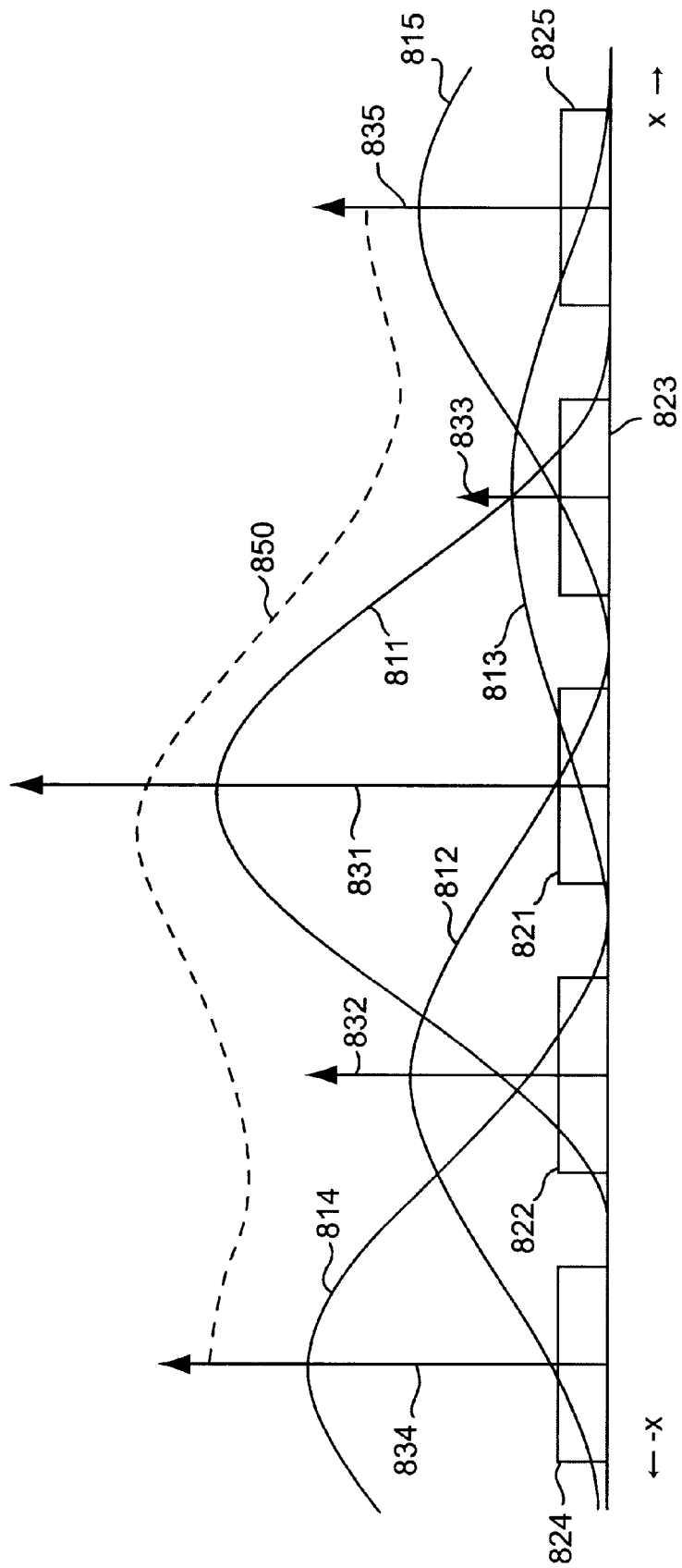
FIG. 8(a) is an exemplary waveform for a reconstructed image function, according to one embodiment of the present invention.
Figure 8B:
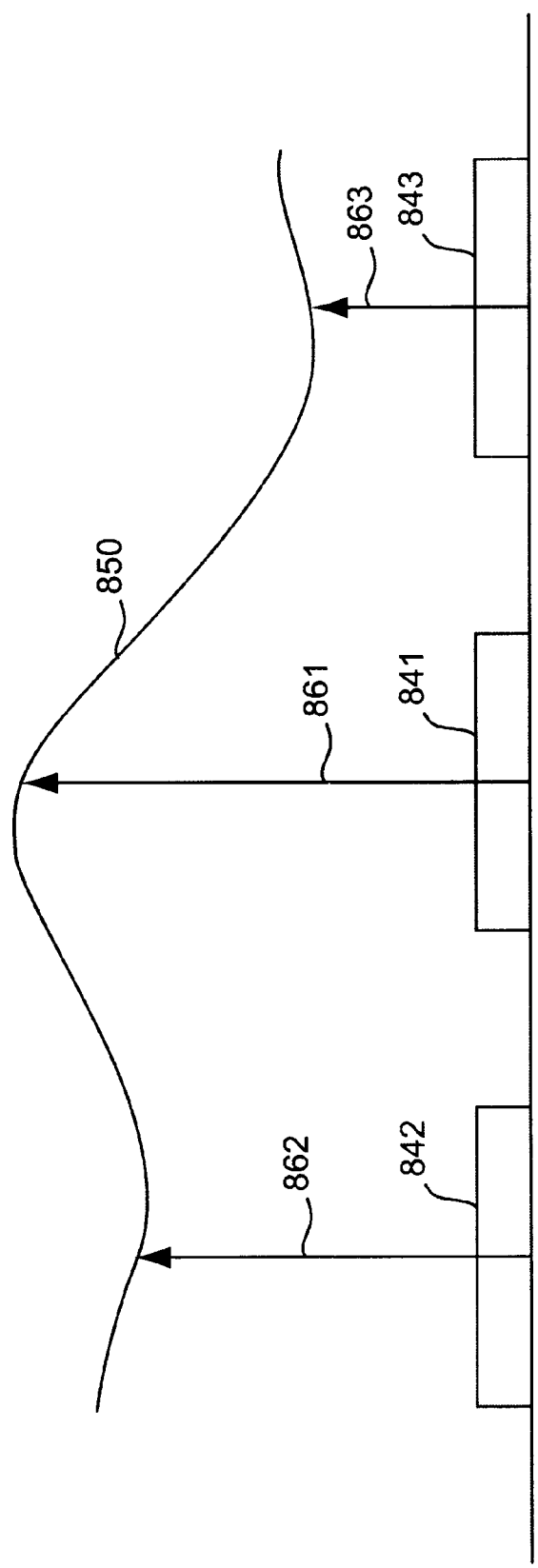
FIG. 8(b) is a set of rescaled pixels corresponding to the reconstructed image function of FIG. 8(a), according to one embodiment of the present invention.

Referring now to FIG. 8(b), a set of rescaled pixels corresponding to the reconstructed image function 850 of FIG. 8(a) is shown, according to one embodiment of the present invention. For an image reduction factor of 3/5, reconstructed function 850 is sampled at the location of three destination pixels 841–843. Video interpolator 202 then sets the values of pixels 841–843 equal to amplitudes 861–863 of the samples. Destination pixels 841–843 are then incorporated into a video output image that is stored in video image bank 204.

Magnification stretches the reconstructed signal and thereby lowers the frequency components of the signal. Reduction, however, shrinks the reconstructed signal, raising the frequency components of the signal, and thus possibly creating a new sampling rate that exceeds the Nyquist frequency. Therefore, to make a proper sample, frequency components above the resampling Nyquist frequency must be eliminated.

A solution to the frequency aliasing problem in image reduction is to stretch the filter function for each source pixel by the image reduction factor. The stretched filter functions are wider, and therefore their amplitudes are greater at each point since the. sinc waveform dampens more slowly. The sum of amplitudes of functions is correspondingly greater, and so the sum is divided by the image reduction factor to assure renormalization. The width of the filter function is based on the distance between samples in the destination image relative to the source image.

Functions 811, 812, 813, 814, and 815 are centered on five source pixels 821, 822, 823, 824 and 825. Functions 811–815 have been stretched by an image reduction factor, as described above, to eliminate frequency aliasing. Functions 811–815 are summed together to produce reconstructed function 850.

Referring now to FIG. 8(b), a set of rescaled pixels corresponding to the reconstructed image function 850 of FIG. 8(a) is shown, according to one embodiment of the present invention. For an image reduction factor of 3/5, reconstructed function 850 is sampled at the location of three destination pixels 841–843. Video interpolator 202 then sets the values of pixels 841–843 equal to these samples. Destination pixels 841–843 are then incorporated into a video output image that is stored in video image bank 204.

This one-dimensional method of rescaling along the x-axis is generally applicable to multi-dimensional applications. A two-dimensional image function g(x,y) is rescaled along a first (e.g. horizontal) axis and then along a second (e.g. vertical) axis. Any pixel (x,y) is affected by contributions from other pixels in the same row as pixel (x,y) and by pixels in the same column as pixel (x,y). Preferably, the smaller axis is scaled before the larger axis.

The image amplitude represented by the sum of filter functions $f(x)$ and $f(y)$ relates to a set of image parameters including color, intensity, and brightness, or, alternatively, any system of variables for representing an image on a display monitor. Optionally, each of these parameters may be separately rescaled. In one embodiment, resealing parameters represent the amplitudes of color vectors X, Y, Z on the CIE color chart. In another embodiment, only one parameter, representing the intensity of a black and white image, is required. Thus, it is possible to interpolate a color image by inserting intermediate values of hue and chrominance between source pixels.

Figure 9:
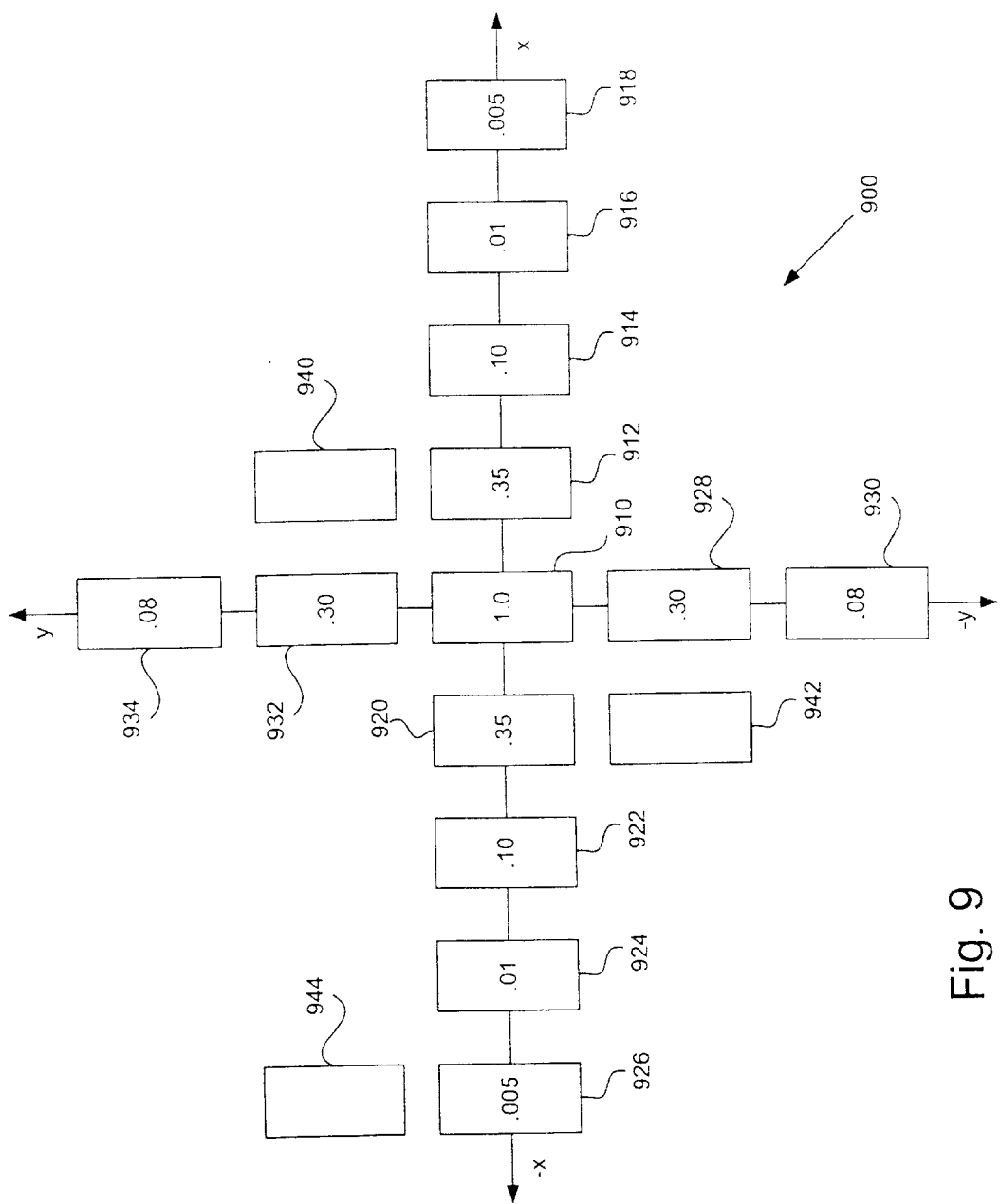
FIG. 9 is a block diagram for one embodiment of a filter coefficient table for a source pixel, according to the present invention.

Referring now to FIG. 9, a block diagram for one embodiment of a filter coefficient table 900 for a pixel (x,y) 910 is shown, according to the present invention. In the FIG. 9 embodiment, only neighboring pixels of pixel 910 contribute to a rescaled image in each pass. Horizontal neighboring pixels contribute during horizontal scaling, and vertical neighboring pixels contribute during vertical scaling. Neighboring pixels are defined as those pixels that lie in the same row (x-axis) and column (y-axis) as pixel 910. In FIG. 9, pixel 910 has neighboring pixels 912–926 along the x-axis, and neighboring pixels 928–934 along the y-axis. Non-neighboring pixels are defined as those pixels that do not lie along the particular row or column containing pixel 910, for example, pixels 940, 942, and 944. Thus filter coefficient table 900 includes values for pixel 910 and its neighboring pixels.

The values in filter coefficient table 900 are normalized for unitary amplitude so that the value of pixel 910 is 1.0 and the values of the neighboring pixels are less than unity. Filter coefficient table 900 is utilized for each pixel in a source image to produce filter functions for each source pixel. The filter function for a source pixel is obtained by multiplying each value in filter coefficient table 900 by an amplitude factor A, which is the value of the source pixel.

The values of filter coefficient table 900 correspond to a sinc filter function $f(x,y)$. Sinc function $f(x,y)$ is two separable functions $f(x)$ and f(y) such that $f(x,y)=\{f(x), f(y)\}$. The values of the sinc filter function may be represented as a matrix M, for each point (x,y). Matrix M has non-zero values only for a row and a column containing pixel (x,y). Use of matrix M relieves the necessity for dynamic calculation of ƒ(x) and ƒ(y) as continuous functions. Discrete values of ƒ(x) and ƒ(y) are calculated once and stored in matrix M for all pixels (x,y). For a 7:5 magnification ratio, matrix M need only contain calculated values of ƒ(x,y) at the source and destination pixel locations.

Computation of matrix M is complicated by the fact that sinc function ƒ(x,y) has infinitesimal values at pixels far removed from a source pixel (x,y). These infinitesimal values add little, if any, accuracy to a reconstructed function, yet require a significant amount of processing. Thus, the present invention provides simplification and increases efficiency of the rescaling process by utilizing a filter function ƒ(x,y) with an amplitude that dampens to insignificant values faster than the amplitude of a sinc function. In an alternate embodiment, the present invention utilizes a sinc function and sets equal to zero the sinc coefficients for pixels located more than a predetermined number of pixels from a source pixel.

The present invention utilizes a sinc product function as a filter function in the rescaling process. The sinc product function is preferably determined by multiplying a first sinc function $f_1(x)$ with a second sinc function $f_2(x)$. The second sinc function $f_2(x)$ has a second period, $p_2$, which is an odd integer multiple, n, of a first period, $p_1$, of the first sinc function $f_1(x)$. Preferably, period $p_2$ is five times larger than first period, $p_1$, i.e. n=5. The product of functions $f_1(x)$ and $f_2(x)$ defines a sinc product function S(x), where:

$$S(x) \equiv f_1(x) * f_2(x) \text{ and,}$$
$$S(x) = \frac{\sin(\pi x)}{\pi x} * \frac{\sin(\pi x/n)}{\pi x/n}.$$

So, for n=5, $$S(x) = \frac{\sin(\pi x)}{\pi x} * \frac{\sin(\pi x/5)}{\pi x/5}.$$

The resulting sinc product function will have a greater amplitude and a longer period than the sinc function. The sinc product function is preferably normalized before being utilized in the rescaling process. The normalized sinc product function has an amplitude of unity at the origin, and has a smaller amplitude than a sinc function as the function converges to zero.

Figure 10:
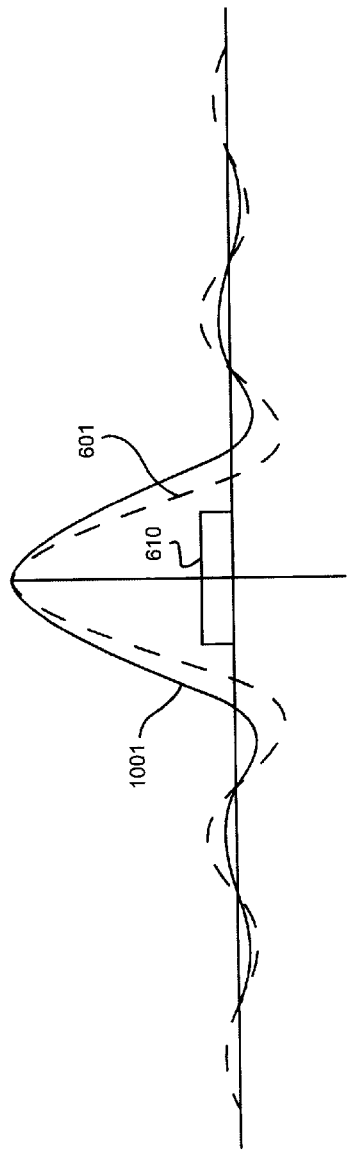
FIG. 10 is an exemplary waveform and corresponding matrix values for a sinc function and a sinc product function, according to one embodiment of the present invention.

Referring now to FIG. 10, an exemplary waveform and corresponding matrix values for a sinc function 601 and a sinc product function 1001 are shown, according to one embodiment of the present invention. Sinc function 601 and sinc product function 1001 are both centered about pixel 610 and scaled to the value of pixel 610. As shown in FIG. 10, sinc function 601 and sinc product function 1001 have identical maximum amplitudes. However, sinc product function 1001 has side-lobes which are of lesser amplitude than the side-lobes of sinc function 601.

Sinc function 601 has significant non-zero amplitudes at pixel locations far away from pixel 610. In contrast, sinc product function 1001 has insignificant non-zero amplitudes at pixel locations only a small distance away from pixel 610. Since the amplitude of sinc product function 1001 becomes insignificant more rapidly than the amplitude of sinc function 601, filter coefficients for sinc product function 1001 are advantageously not required for pixels located far away from a source pixel. Utilizing sinc product function 1001 as the filter function thus significantly reduces the amount of processing required to rescale a video image.

FIG. 10 also shows matrices corresponding to sinc function 601 and sinc product function 1001. Matrix 1010 contains filter coefficients that correspond to sinc function 601, and matrix 1020 contains filter coefficients that correspond to sinc product function 1001. Matrix 1010 contains small but non-trivial filter coefficients at locations four pixels away on the horizontal axis. In contrast, matrix 1020 contains filter coefficients that are much smaller than the filter coefficients of matrix 1010. Matrix 1020 advantageously contains filter coefficients equal to zero at locations four pixels away on the horizontal axis.

Figure 11:
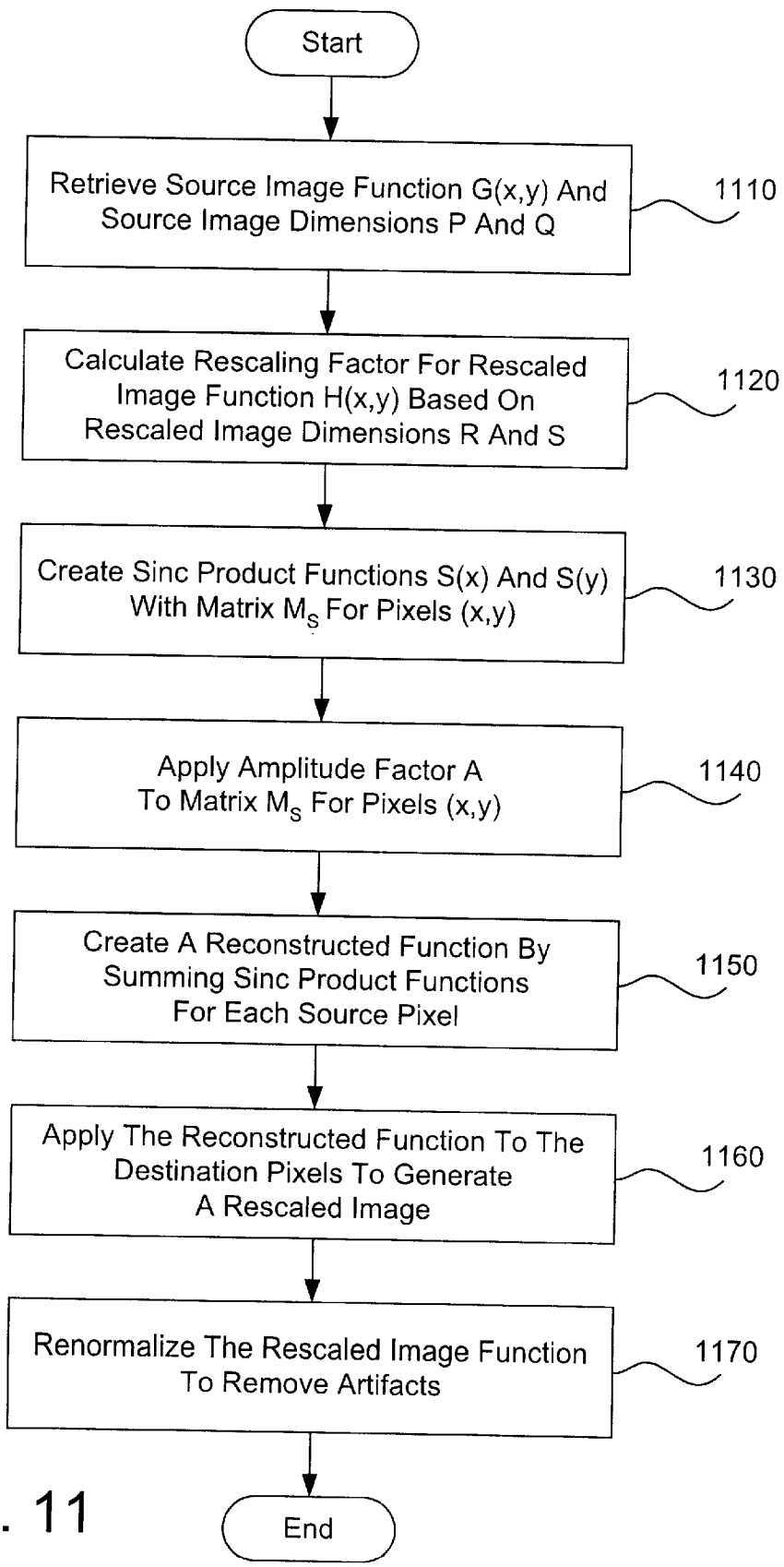
FIG. 11 is a flowchart of method steps for resealing an image, according to one embodiment of the present invention.

Referring now to FIG. 11, a flowchart of method steps for rescaling an image is shown, according to one embodiment of the present invention. Initially, in step 1110, a two-dimensional source image function g(x,y), with dimensions p and q, is retrieved from video image bank 204. In step 1120, video interpolator 202 determines a rescaling factor using rescaled image dimensions r and s, and the source image dimensions p and q. Then, in step 1130, sinc product functions S(x) and S(y) are created for each pixel (x,y) in the source image using matrix $M_s$(FIG. 10).

In step 1140, matrix $M_s$ is multiplied by an amplitude factor A from source image function g(x,y) for each pixel (x,y). In step 1150, video interpolator 202 creates a reconstructed function by summing the sinc product functions S(x) and S(y) using table matrix $M_s$ modulated by amplitude factors A for each pixel (x,y). Then, in step 1160, video interpolator 202 determines the values of the reconstructed function at the location of destination pixels in the rescaled image. Finally, in step 1170, video interpolator 202 renormalizes the rescaled image function to remove artifacts.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A method of rescaling an image, comprising:

receiving a source image including source pixels, each source pixel having an associated amplitude;

creating destination pixel locations based on a rescaling factor;

centering a sinc product function S(x) on each of the source pixels, the sinc product function S(x) being a product of a first sinc function and a second sinc function;

summing the sinc product function S(x) for each of the source pixels to generate a reconstructed function; and determining amplitudes for destination pixels according to an amplitude of the reconstructed function at the destination pixel locations;

wherein a horizontal direction of the source image is rescaled independently from a vertical direction of the source image; and wherein each direction of the source image is rescaled using the sinc product function S(x), given by the equation:

$$S(x) = \frac{\sin(\pi x)}{\pi x} * \frac{\sin(\pi x/n)}{(\pi x/n)}.$$

2. The method of claim 1, wherein n is equal to five.

3. A method of rescaling an image:
receiving a source image including source pixels, each source pixel having an associated amplitude;
creating destination pixel locations based on a rescaling factor;
centering a sinc product function on each of the source pixels, the sinc product function being a product of a first sinc function and a second sinc function;
summing the sinc product function for each of the source pixels to generate a reconstructed function; and
determining amplitudes for destination pixels according to an amplitude of the reconstructed function at the destination pixel locations;
wherein the first sinc function has a first period that is different than a second period of the second sinc function and wherein the second period is an odd integer multiple of the first period.

4. The method of claim 3, wherein the odd integer multiple is five.

5. The method of claim 3, wherein a horizontal direction of the source image is rescaled independently from a vertical direction of the source image.

6. The method of claim 3, further comprising normalizing the amplitudes of the destination pixels to remove image artifacts.

7. A computer-readable medium containing program instructions for rescaling an image, by:
receiving a source image including source pixels, each source pixel having an associated amplitude;
creating destination pixel locations based on a rescaling factor;
centering a sinc product function S(x) on each of the source pixels, the sinc product function S(x) being a product of a first sinc function and a second sinc function;
summing the sinc product function S(x) for each of the source pixels to generate a reconstructed function; and
determining amplitudes for destination pixels according to an amplitude of the reconstructed function at the destination pixel locations;
wherein a horizontal direction of the source image is rescaled independently from a vertical direction of the source image; and
wherein each direction of the source image is rescaled using the sinc product function S(x), given by the equation:

$$S(x) = \frac{\sin(\pi x)}{\pi x} * \frac{\sin(\pi x/n)}{(\pi x/n)}.$$

8. The computer-readable medium of claim 7, wherein n is equal to five.

9. A computer-readable medium containing program instructions for rescaling an image, by:
receiving a source image including source pixels, each source pixel having an associated amplitude;
creating destination pixel locations based on a resealing factor;
centering a sinc product function on each of the source pixels, the sinc product
function being a product of a first sinc function and a second sinc function;
summing the sinc product function for each of the source pixels to generate a reconstructed function; and
determining amplitudes for destination pixels according to an amplitude of the reconstructed function at the destination pixel locations;
wherein the second sinc function has a second period that is an odd integer multiple of a first period of the first sinc function.

10. The computer-readable medium of claim 9, wherein the odd integer multiple is five.

11. A system for rescaling an image, comprising:
means for receiving a source image including source pixels, each source pixel having an associated amplitude;
means for creating destination pixel locations based on a rescaling factor;
means for centering a sinc product function S(x) on each of the source pixels, the sinc product function S(x) being a product of a first sinc function and a second sinc function;
means for summing the sinc product function S(x) for each of the source pixels to generate a reconstructed function; and
means for determining amplitudes for destination pixels according to an amplitude of the reconstructed function at the destination pixel locations;
wherein the sinc product function S(x) is given by the equation:

$$S(x) = \frac{\sin(\pi x)}{\pi x} * \frac{\sin(\pi x/n)}{(\pi x/n)}.$$

12. The system of claim 11, wherein n is an odd integer.

13. The system of claim 11, wherein n is equal to five.

14. A system for video image rescaling, comprising:
a video interpolator stored in a memory, the video interpolator configured to rescale video images utilizing a sinc product filter function; and
a processor coupled to said memory;
wherein the sinc product filter function is a first sinc function having a first period multiplied by a second sinc function having a second period that is an odd integer multiple of the first period.

15. The system of claim 14, wherein the odd integer multiple is five.

16. The system of claim 14, wherein the sinc product filter function is in the form of a matrix of filter coefficients stored in the memory.

17. The system of claim 16, wherein the video interpolator multiplies amplitudes of source pixels in a source image by the matrix of filter coefficients to produce a destination image.

* * * * *